Patented Sept. 20, 1949

2,482,684

UNITED STATES PATENT OFFICE 2,482,684

SOLUTIONS OF TETRAALKYLSILICATES

Harold R. Moulton, Southbridge, Mass., assignor to American Optical Company, Southbridge, Mass., a voluntary association of Massachusetts No Drawing. Original application July 23, 1943, Serial No. 495,906. Divided and this application January 18, 1946, Serial No. 642,101

8 Claims. (Cl. 106—287)

This application is a division of my co-pending application Serial No. 495,906, filed July 23, 1943, Patent No. 2,474,061.

The principal object of the invention is to provide novel solutions of tetraalkylsilicates in organic solvents to be used in methods of reducing the reflection of light impinging upon the surface of an article whereby, in the case of a transparent article, a greater percentage of incident light will traverse said article and in the case of an opaque article will reduce the reflectivity of said articles, and in some instances simultaneously increasing the scratch resistance of the surfaces of said articles.

In the prior art, surface coating have been produced for reducing reflections of light impinging upon the surface by commonly known methods.

The first method consists in the application of a multimolecular film amounting in general to a layer approximately 40 molecules thick of an insoluble soap. This layer was subsequently treated with acid whereby the metallic ion in each soap molecule was removed thereby leaving a skeleton structure whose porosity was under that of a wave length of visible light with the result that the effective index of refraction of the remaining layer was substantially lower than that of the original soap and was lower than the index of refraction of the substrate; generally, glass. The reflection reduction obtained by following this technique was generally good but the surface was of great fragility and could not be wiped or handled, nor did it withstand many solvents. Under ordinary atmospheric exposure the film deteriorated rapidly and this method has never, so far as applicant is aware, been used in any commercial production.

Another method which has, in spite of its drawbacks, retained a considerable commercial application, is an outgrowth of vacuum evaporation technique. In this method, a thin layer, generally one quarter of a wave length thick, of a volatile salt or compound of low index is evaporated by means of heat in a vacuum and a deposit is produced upon the surface to be treated. The compounds used are customarily lithium fluoride, calcium fluoride, cryolite, or magnesium fluoride or similar compounds. These compounds produce surface layers which, when very carefully controlled as to thickness, a control which is difficult and which is subject to many variable factors, will become quite efficient as reflection reduction coatings. As such, they have been used in multicomponent lens systems for expensive optical parts, but because of their difficulty of application and poor adaptability to large scale manufacture their use has been restricted. In addition, these coatings suffer from the serious drawback of being readily attacked by moist atmosphere and exposure to the atmosphere causes such coatings to deteriorate rapidly. It has been found necessary, in order to increase the resistance to atmospheric attack and to the attack of moisture to bake these coatings at a relatively high temperature, a proceeding accomplished by risk of damage to the accurate optical parts and one which, in spite of the slight increase in weathering resistance, still falls far short of the weathering resistance of ordinary glass surfaces. These coating suffer from the additional drawback that there is considerable tendency for them to appear hazy or cloudy under certain conditions of illumination and unusual precautions have to be taken to keep this tendency within useable bounds.

Another prior art method of obtaining glass surfaces having reduced reflection consists in the treatment of the surfaces with hydrofluoric acid gas or with dilute aqueous solution of hydrofluoric acid. In this process, certain constituents of the glass are rendered soluble or volatile and are then subsequently abstracted from the surface leaving a film of lower index. Other selected solvents for certain of the compounds present in the glass may be used and have been used in the prior art, such as alkalis, soluble phosphates, nitric acid and even harsh laundry soap. It is obvious that the results obtained by the general type of process will be very greatly dependent upon the chemical composition of the glass or glasses treated and also upon the character and cleanliness of the glass surface itself. Under certain conditions also, surface defects which would normally be invisible are rendered visible to the disadvantage of the article treated. The use of the above described process, of course, is restricted to glass.

It, therefore, is one of the primary objects of this invention to produce surface coatings which will overcome the above disadvantages and provide coatings having similar optical characteristics as to reduction of surface reflections in a simple, more efficient and inexpensive manner and at the same time with extreme resistance to the attack of moist atmosphere and moisture itself, and in some instances more resistant to scratching and chemical attack.

In addition to the reduction of reflection of incident light the coatings as produced serve an chemical protection for the glass or plastic surfaces.

In following the teachings of the invention the article which is to be coated may be of a light transmitting nature such as glass plates, lenses, prisms or other optical elements and similar elements formed of plastics or artificial resins. In this particular instance, the element, as stated above, is to have light transmitting properties.

In the present instance, the articles referred to are particularly of the type which are adapted for use in telescope systems, field glasses, binoculars, camera lenses, periscopes or for any other uses in which the light is adapted to impinge upon a surface of the article. The surfaces of said articles, in order to reduce surface reflection and to increase light transmission, are coated with a stable water insoluble coating of a material having a lower index of refraction than the substrate. This is accomplished by applying a layer of the solution, which upon evaporation, deposits such a layer on the glass or material substrate. The material which forms this layer need not be present in the solution in the actual form in which it finally exists on the surface of the article but may be a decomposable compound which upon the removal of the solvent leaves a surface layer on the substrate in the desired state, for example, a solution of from 1 to 10 per cent by volume of tetraethylorthosilicate, 0 to 60 per cent by volume ethyl acetate, 1 to 10 per cent by volume concentrated hydrochloric acid and the balance ethyl alcohol. Denatured alcohol may be substituted for a part or all of the ethyl alcohol. A preferred solution is five parts of tetraethylorthosilicate, 50 parts of ethyl acetate, 50 parts of denatured alcohol and 5 parts of concentrated hydrochloric acid, mixed in the order given. This gives a clear, colorless, stable solution. An essential feature of this solution is aging for several days before use. The exact reason for this is not known but it is believed to be a partial decomposition of the tetraethylorthosilicate by the hydrochloric acid resulting in an organo-sol of either hydrated or unhydrated silica. With the composition set forth above, an aging of from two to six days is desirable. It has been found desirable for certain articles, such as lenses, especially those of steep curve, to spin the article at relatively slow speed and pour upon the upper surface thereof a small measured quantity of the solution. In this way, one surface may be done at a time and the smoothness and uniformity of the coating may be increased. In either case, the spinning of the article is continued until the layer of solution formed thereby has evaporated sufficiently so that no drips or runs will occur when the article is removed from the holder. Prolonged aging to two or three months produces no further change. This aging normally takes place at room temperatures but it can be accelerated slightly by working at more elevated temperatures up to 50° C.

The solution having been prepared and aged, the procedure is as follows:

The lens or other article is immersed in this liquid, removed and immediately spun in order to remove excess liquid. Over a very wide range of translational velocities the effective thickness of the resulting layer is in the range for efficient reflection reduction thereby differing from previous methods of obtaining reflection reduction in which the efficiency of the final product is greatly dependent upon the variation of thickness in the film. At this point, at least three alternative methods may be as follows:

In the first method the article is placed in a moist atmosphere at a temperature of approximately 100° C. for a time interval sufficient to substantially heat the entire article to said temperature after which the article may be cooled. This procedure renders the coating insoluble in acids or water and difficultly soluble in alkaline solutions. The coating produced by this method reflects approximately 1% on glass of 1.52 index of light from each surface. In other words, for a flat piece of glass treated by this method substantially 98% of the incident light traverses it in contradistinction to the figure 91.8 which is the inherent transmission of glass of this index of refraction. If the glass, for example, is of a higher index of refraction than 1.52 the reduction of reflection is still greater. The treatment at 100° C. moist heat, serves to expedite the rendering insoluble of the surface reflection reducing coating. There is a more rapid increase in the hardness of this surface than occurs in the next two methods but the end result in all cases is substantially the same as regards hardness and insolubility. Although I have referred to the temperature as being 100° C. it is to be understood that any suitable heating temperatures may be used and been found that a wider range of temperatures may be used and produce surface coatings of substantially similar characteristics, the top limit of such temperatures being set by the softening or distortion point of the material being treated, the lower temperature of 100° C. being preferable for use as it permits composite structures which are united by cementing or the like which are capable of withstanding this temperature but which would be susceptible to injury at higher temperatures. Lower temperatures, which are above room temperatures, are therefore preferably desiable. The temperature, therefore, must mainly be such as to produce coatings having desired characteristics without injury to the initial article. The temperatures referred to hereinafter are therefore to be considered in the light of the above.

The second method consists in holding the article at room temperature after the solution has been applied and the excess removed by any convenient means such as the spinning as set forth above. The article is held at room temperature in normally moist air for a period of approximately one minute, the time varying inversely with the ambient temperature. At the expiration of this exposure period the article is subjected to the action of water which may be cool or warm for any convenient period of time as it has been found that variations in the time of water treatment have substantially the same effect. This treatment somewhat increases the reflection reduction above mentioned but the article may be heated to 100° C. subsequently in order to insure permanency. It is felt that this gives a somewhat more porous surface and one which is somewhat less easy to clean.

The third method consists in simply allowing the article to stand at room temperature after the excess solution has been drained off or removed by spinning in which case the article should not be handled for some little time. About an hour has been found a desirable period.

For coating larger surfaces, it has been found that dilution of the original solution with a suitable solvent of which a mixture of equal parts of denatured alcohol and ethyl acetate have been found to produce practical results, may be used.

In this case, multiple dips followed by draining, are desirable, with the article being so oriented as to drain in a different direction after each dip whereby the effectiveness of the coating is maintained substantially uniform over the article. This procedure is particularly useful in coating large sheets.

Each coating may be heat treated, as above described, before the application of the succeeding coating or the coating may be simply allowed to dry in air as described in method #3 or the final product may be treated with water as described in method #2 or any combination of these procedures may be followed either on each individual coating or on any one of the successive coatings.

In the above example, tetraethylorthosilicate has been mentioned as has hydrochloric acid, denatured alcohol and ethyl acetate. It is, of course, understood that other alkyl silicates, such as tetramethylorthosilicate, or other esters of silicic acid may be used instead of tetraethylorthosilicate and it is also to be understood that other acids instead of hydrochloric acid may be used with equal effectiveness such as nitric acid, sulphuric acid, hydrobromic acid, and the solvents used; denatured alcohol and ethyl acetate, have been selected as being the convenient ones readily commercially available and cheap. Other solvents, however, it has been found, may be used. The sole solvent may be denatured alcohol, for example, but it is found that the ethyl acetate assists in giving a uniform layer. In this particular instance, for example methyl acetate, methyl alcohol, amyl acetate, isopropylalcohol, or in fact most organic solvents may be used in which both the silicon ester and the acid are both soluble. It is to be understood also that the organo-sol of silica may be separately prepared and purified and used in suitable solvents.

It has been found that other organic solvents than those enumerated may be used to advantage; for example:

Cellosolve (ethylene glycol mono ethyl ether) approximately 24%; butyl Cellosolve (ethylene glycol mono butyl ether) approximately 10%, butyl alcohol approximately 16%, denatured alcohol approximately 40%, tetraethylorthosilicate approximately 5%, and concentrated hydrochloric acid approximately 5%.

The relative proportions of these various ingredients may be varied in accordance with the method of application as lower speed of rotation during or subsequent to the application to the article to be coated will require a lower concentration of the active ingredient; namely the tetraethylorthosilicate. The high boiling solvents, such as ethylene glycol mono ethyl ether, ethylene glycol mono butyl ether and butyl alcohol may have their proportions varied so as to control the rate of evaporation of the solvent. In the case of high atmospheric humidity a reduction in the amount of the denatured alcohol and its replacement by higher boiling solvents results in a more uniform haze-free coating.

Another composition which may be used advantageously consists of ethylene glycol mono ethyl ether approximately 94% by volume, tetraethylorthosilicate approximately 5% by volume, concentrated hydrochloric acid approximately 1% by volume. This particular composition is particularly resistant to the effects of atmospheric humidity. It has been found also that a composition consisting of approximately 72% denatured alcohol, 7% tetraethylorthosilicate approximately 20% ethylene glycol mono ethyl ether and approximately 1% hydrochloric acid gives excellent coatings of high permanence and good efficiency. Substantially 50% of the ethyl alcohol may be replaced by ethyl acetate if desired.

It is believed that there has been produced a micro-porous insoluble abrasion resistant layer of silicon dioxide on the surface of the article, the pores being smaller in dimension than a wave length of light. This micro-porous silica layer has an effective index of refraction due to its porosity of less than 1.4 thus more nearly fulfilling the requirements for a layer whose index of refraction is equal to the square root of the index of refraction of the substrate than do silicon dioxide layers produced by evaporation and the like. The relative proportions under the conditions of use are such as to produce a film of this index and of such thickness that the reflected light from one surface of the layer is approximately one half wave out of phase with the reflected wave from the other surface of the layer, or any number of full waves plus one half wave out of phase.

It is to be understood also that there may be incorporated in the solution substances which retain their solubility in suitable solvents after the body of the film itself has been rendered insoluble. Such substances when subsequently leached out by suitable solvent treatment modify the porosity of the surface reflection reducing layer and give an additional control of the resultant effective index of refraction of said layer. It has been found that substances, such as urea, paraphenylenediaminedihydrochloride, glycerine, caffein hydrochloride, magnesium chloride, calcium chloride and in general other compounds soluble in the solvents used in making up the solution and which remain uniformly and minutely dispersed throughout the resulting coating and which after the coating itself has become set and insoluble may subsequently be removed by a solvent such as water leaving, when leached out, a coating which is considerably more micro-porous than the coating which does not contain the soluble constituents. This gives an additional reduction of the refractive index of the resulting finished coating.

While these coatings in their finished form are of great stability, before the heating operation or before the coatings have stood too long it is possible to remove a coating which has been damaged or which for some reason was defective, by treatment with dilute alkali in which instance the article can be recoated without damage.

In the solution there is a compound which is capable of being decomposed and depositing a layer of silica, such a compound being tetraethylorthosilicate or other analogous compound and also in the solution there is a compound capable of decomposing the decomposable silicon compounds, this decomposing agent being the acid referred to above. In the dilute solution, as applied, it is believed that the two reacting materials do not interact rapidly or completely but that as the solvent is removed the concentrations of the decomposable substance and the decomposing agent build up until concentrations are reached at which the reaction takes place rapidly. At this time and not before, the coherent film or layer of silica is deposited on the surface of the article to which the solution has been applied, the film subsequently being hardened either by aging or by treatment with moist heat as described above.

In the examples given, hydrochloric acid is the decomposing agent which reacts with tetraethylorthosilicate to form silicon dioxide. If these two ingredients are mixed in concentrated form the mixture becomes hot and solidifies in a few minutes. The solvent or solvents used in the disclosed solutions serve to prevent jelling and produce a relatively permanent solution useable for a period of time and one which has suitable evaporation characteristics. The solvent used may be, of course, simple or complex, that is to say, it may consist of a single chemical compound, such as ethyl acetate, alcohol or in fact any solvent in which the reacting substances can be dissolved. The solvent may be a complex solvent consisting of two or more suitable solvents mixed in any desired proportion within the range of workability in which case the relative evaporation rates of the solvents may differ and the process of building up the concentrations of the decomposable substance and the decomposition agent may be further controlled.

When surface coatings of the type set forth herein are applied to materials such as polymeric methyl methacrylate and the like, cellulose acetate, cellulose nitrate, cellulose acetate-butyrate, polystyrene and other resinous or plastic materials the coating has a considerably higher intrinsic hardness than the inherent surface hardness of the article itself and therefore imparts an increased resistance to scratching and abrasion. In addition, the inert chemical nature of the resulting coating and its freedom from cracks, and interpenetrating pores serve to protect the body of the article from attack by solvents which normally would injure it. For example, polymeric methyl methacrylate is readily attacked and dissolved by ethylene dichloride, a commonly used solvent. When, however, the above described coating has been applied to an article of polymeric methyl methacrylate the ability of ethylene dichloride to attack the polymeric methyl methacrylate is greatly reduced and in some cases no attack is produced on prolonged exposure. The coating also protects the various plastics against what is known as "solvent crazing" which is a superficial cracking of the surface of a stressed plastic part by exposure to vapors of a solvent or to the solvent itself.

Although we have specified that the articles to be treated are of a transparent nature it is to be understood that any article of opaque or transparent material might be similarly coated; for example, an article of suitable metal might be provided with surface coatings of the above character in which instance the article will be rendered less visible or more resistant to chemical injury and, of course, the same statements apply to opaque glasses, glazes, paints, plastics or in fact any substance crystalline or non-crystalline.

Although the given proportions are set forth above, it is to be understood that the proportions of the various ingredients might be varied in accordance with the procedure followed and in order to produce a thicker coating the content of the silica ester would be increased and to produce thinner coatings the proportions would be decreased with the remaining ingredients substantially increased or decreased proportionately. The concentration of the various ingredients varies according to the number of surface coatings applied. If a plurality of surface coatings are to be applied, it is to be understood that the concentrations may be formed relatively weak as compared with concentrations which are to be applied in a single surface coating.

The coating compositions set forth above do not depend upon fortuitous decomposition of the decomposable silicon compounds by atmospheric moisture or by moisture or other substances diffusing out of the material to which the coating is applied, but the decomposition agent is present in the solution in controlled concentration and in such a form that until the coating has been concentrated by evaporation after application to the article the reactions do not take place and the solution is completely stable until such time as this evaporation takes place. This is one of the main distinctions of the present invention over known prior art.

The siliceous coating formed by the above described methods may also serve as the carriage and/or protector of coloring matters, such as dyes, pigments and the like. In general, spirit soluble dyes should be used in suitable quantities to produce the desired tinctorial effect in the finished film and may be dissolved in the solution used in forming such film. Upon evaporation of the solvent and the completion of the hardening of the film the dyestuff or pigment remains in permanent form uniformly dissolved in or scattered throughout the film. Likewise, white finely divided pigments, such as titanium dioxide or other similar white pigments having a high index of refraction may be suspended in the film-forming solution and upon the removal of the solvent and completion of the formation of such film the particles remain therein and serve as light diffusing means.

The film containing either the dyes or the pigments may also be used for modifying the color of articles in general, mineral, metallic, or organic, whereby a surface color of high permanence may be applied to the article.

Incorporation of fluorescent compounds, either in solution or as finely divided particles in the coating solution, produce fluorescence when irradiated with radiation of suitable wave length. In the prior art, such fluorescent pigments have made use of organic binders, such as lacquers, varnishes, etc. which suffer from the serious drawback of limited transparency to the radiation and lack of heat stability and/or chemical stability. The siliceous coating having these fluorescent substances incorporated in it is obviously free from these drawbacks having great heat stability and high chemical permanency.

Certain inorganic compounds, such as cerium compounds, possessing the property of absorbing ultra-violet radiation may be incorporated in the original solution and upon evaporation of the solution remain in the siliceous layer.

Certain organic compounds, not generally considered as dyestuffs, such as diphenyl, quinin, anthracene and naphthalene, for example, may be dissolved in the original solution and produces upon evaporation of the solvents films having ultra-violet absorption.

Coatings of the above character are particularly advantageous when used on articles having relatively smooth or highly polished optical surfaces such, for example, as exist on lenses or other optical elements. In the case of lenses which have highly polished optical surfaces thereon such surface coatings increase the transmission of light and thereby greatly increase the efficiency of said optical elements.

It is to be understood that when applicant refers to acids throughout the specification and in the claims as a general statement, it is intended to mean any acid with the exception of hydrofluoric acid, or to mean an acid which is inert as to its effect on silica.

The compositions of the solutions render it possible to apply said coatings with great ease and with great uniformity and speed without the requirement of special coating equipment and further distinguishes from most prior art coating technique in that the solutions are particularly adaptable to wide area coverage with ease and simplicity and are exceedingly transparent and particularly adaptable for coating optical elements because of the uniformity of coating which may be obtained with such composition and which will have little or no altering effect upon the desired refractive characteristics of said optical elements. In addition, the formation of such a silica film or layer is not dependent upon the chance occurrence in the atmosphere of a decomposing agent which, of course, is not controllable and produces inconsistent results. The solutions of the present invention positively control the decomposing characteristics and provide means for obtaining positive, accurate and rapid results under definite control.

From the foregoing description it will be seen that simple, efficient and economical means and methods have been provided for accomplishing all of the objects and advantages of the invention.

Having described my invention, I claim:

1. A solution capable of depositing on a given surface upon volatilization of its volatile component a substantially smooth transparent adherent layer of silicon dioxide having an effective thickness of a quarter lambda, said solution comprising silicic acid alkyl ester selected from the group consisting of tetraethylorthosilicate, tetramethylorthosilicate and mixture thereof, and a strong mineral acid reactable with the ester, the acid embodying from approximately one to ten per cent by volume of the whole solution, and the balance substantially all a readily volatile water miscible organic solvent said solvent being miscible with both the acid and the ester, and the proportion of the acid and solvent being at least 90% of the solution whereby hydrolysis of the ester by the acid in the solution is substantially avoided.

2. A solution capable of depositing on a given surface upon volatilization of its volatile component a substantially smooth transparent adherent layer of silicon dioxide having an effective thickness of a quarter lambda, said solution comprising tetraethylorthosilicate and a strong mineral acid reactable with the tetraethylorthosilicate, the acid embodying from approximately one to ten per cent by volume of the whole solution, and the balance substantially all a readily volatile water miscible organic solvent said solvent being miscible with both the acid and the tetraethylorthosilicate and the proportion of the acid and solvent being at least 90% of the solution whereby hydrolysis of the tetraethylorthosilicate by the acid in the solution is substantially avoided.

3. A solution for reducing the light reflective characteristics of an article treated thereby consisting of:

| | Parts by volume |
|---|---|
| Tetraethylorthosilicate _____approximately__ | 5 |
| Ethyl acetate _____do____ | 50 |
| Denatured alcohol _____do____ | 50 |
| Concentrated hydrochloric acid_____do____ | 5 |

4. A solution for reducing the light reflective characteristics of an article treated thereby consisting of approximately 1 to 10 per cent by volume of a silicic acid alkyl ester selected from the group consisting of tetraethylorthosilicate, tetramethylorthosilicate and mixtures thereof, approximately 1 to 10 per cent of a strong mineral acid, with the remainder of the solution consisting of water miscible readily volatile organic solvent in which the acid and silicic acid alkyl ester are both soluble.

5. A solution for reducing the light reflective characteristics of an article treated thereby consisting of approximately 1 to 10 per cent by volume of a silicic acid alkyl ester selected from the group consisting of tetraethylorthosilicate, tetramethylorthosilicate and mixtures thereof, approximately 1 to 10 percent of a strong mineral acid, with the remainder of the solution consisting of water miscible, volatile saturated aliphatic solvent containing only oxygen, hydrogen, and carbon and in which the acid and silicic acid alkyl ester are both soluble.

6. A solution for reducing the light reflective properties of an article treated thereby consisting of:

| | Per cent by volume |
|---|---|
| Tetraethylorthosilicate __approximately__ | 1 to 10 |
| Hydrochloric acid _____do____ | 1 to 10 |
| Ethyl acetate _____do____ | 0 to 60 | and the balance a mixture of ethyl alcohol and denatured alcohol.

7. A solution for reducing the light reflective properties of an article treated thereby consisting of:

| | Per cent by volume |
|---|---|
| Tetraethylorthosilicate __approximately__ | 1 to 10 |
| Hydrochloric acid _____do____ | 1 to 10 |
| Ethyl acetate _____do____ | 0 to 60 | and the balance ethyl alcohol.

8. A solution for reducing the light reflective properties of an article treated thereby consisting of:

| | Per cent by volume |
|---|---|
| Tetraethylorthosilicate __approximately__ | 1 to 10 |
| Hydrochloric acid _____do____ | 1 to 10 |
| Ethyl acetate _____do____ | 0 to 60 | and the balance denatured alcohol.

HAROLD R. MOULTON.

REFERENCES CITED

The following references are of record in the file of this patent:

UNITED STATES PATENTS

| Number | Name | Date |
|---|---|---|
| 1,809,755 | King | June 9, 1931 |
| 2,329,632 | Marsden | Sept. 14, 1943 |
| 2,347,733 | Christensen | May 2, 1944 |

FOREIGN PATENTS

| Number | Country | Date |
|---|---|---|
| 568,545 | Germany | Jan. 21, 1933 |
| 466,482 | Great Britain | May 28, 1937 |